United States Patent

Hubbard

[11] 4,016,572
[45] Apr. 5, 1977

[54] THERMOGRAPHIC STYLUS WITH INHERENT PRESSURE CONTROL

[75] Inventor: James R. Hubbard, Moorestown, N.J.

[73] Assignee: Graphic Controls Corporation, Buffalo, N.Y.

[22] Filed: Mar. 15, 1976

[21] Appl. No.: 667,029

[52] U.S. Cl. .................. 346/139 C; 346/76 R; 219/233
[51] Int. Cl.² .............. G01D 15/16; G01D 15/10; H05B 1/00
[58] Field of Search ............ 346/76 R, 139 C; 219/233

[56] References Cited

UNITED STATES PATENTS

| | | | |
|---|---|---|---|
| 2,358,102 | 9/1944 | Robertson | 346/139 C |
| 2,489,062 | 11/1949 | Thompson | 346/139 C |
| 3,312,980 | 4/1967 | Erbach | 346/139 C |
| 3,653,069 | 3/1972 | Baring | 346/139 C |
| 3,689,937 | 9/1972 | Phillips et al. | 346/139 C X |
| 3,907,090 | 9/1975 | Northfield et al. | 346/76 R X |

FOREIGN PATENTS OR APPLICATIONS

| 420,649 | 3/1967 | Switzerland | 346/76 R |
|---|---|---|---|

*Primary Examiner*—George H. Miller, Jr.
*Attorney, Agent, or Firm*—Miller & Prestia

[57] ABSTRACT

A thermographic stylus apparatus includes a bimetal spring element in the pen arm and a resistive heating means. The pressure exerted by the scribing element on the writing platen is varied in linear proportion to the total power consumed in the resistive heating means which causes bending or at least a tendency to bend in the bimetal.

13 Claims, 3 Drawing Figures

THERMOGRAPHIC STYLUS WITH INHERENT PRESSURE CONTROL

BACKGROUND OF THE INVENTION

This invention relates to thermographic transcription apparatus, and more particularly to thermographic stylus means having inherent pressure control.

In a thermographic apparatus a heated stylus or scribing element is in contact with a writing platen covered by a paper having a blushed lacquer finish. As the stylus moves along the paper, it produces opacity or color change on the finish of the paper, tracing its path over the paper.

While these systems generally are adequate to transcribe the voltage signals, the quality of the transcription, either in line width or opacity, may deteriorate with rapidly changing signals or high writing speed. More particularly, for a given temperature and pressure, the more rapid the time rate of change which the signal experiences, the more variability will occur in the quality of the transcribed signal. That is, if the input voltage signal changes rapidly and has a high transient content, drag between the stylus and the paper may limit the responsiveness of the stylus, thereby causing some or all high frequency components of the voltage signal to be lost in the transcription process. Conversely, if stylus pressure is adjusted to be sufficiently light that drag problems are avoided, a poorer quality of transcribed signal results, an unfortunate consequence for signals having lower rates of change and therefore not experiencing problems of drag.

It is accordingly a primary object of the present invention to provide a self actuated thermographic stylus in which the pressure exerted is adequate to produce a high quality transcription for low signal rates, but which is adjustable in proportion to signal changes or writing speed.

SUMMARY OF THE INVENTION

The present invention achieves the foregoing object by providing a stylus whose pressure is linearly proportional to the power supplied to an associated heating means. In particular, the pressure between the stylus and the writing platen is regulated by a bimetallic spring element in the pen arm. A voltage is applied to a resistive heating element in the proximity of the bimetallic spring, as well as to the heated stylus. As this voltage is changed, a proportional change in the deflection of the bimetallic spring, and consequent alteration of pressure exerted by the stylus onto the writing platen, occurs.

In an illustrative embodiment, a bimetallic spring extends from a mounting block with a stylus at its distal end. Connected between the mounting block and the stylus along the bimetallic spring is a resistive heating element, and completing the electrical circuit with the input voltage is the heated stylus element. Depending upon whether the one of the elements of the bimetal having the higher thermal expansion coefficient is the top or the bottom of the bimetallic spring, an increase in the total power of the input voltage to the heating circuit respectively attempts to deflect the bimetallic spring either toward or away from the platen.

It is a primary feature of the present invention that effective pressure control in a thermographic stylus is totally established by a self contained mechanism. Since the pressure applied is determined by and proportional to the total power of the input voltage, a compact yet effective construction may be utilized, which nevertheless features superior heat-pressure interaction.

DETAILED DESCRIPTION

Figure 1:
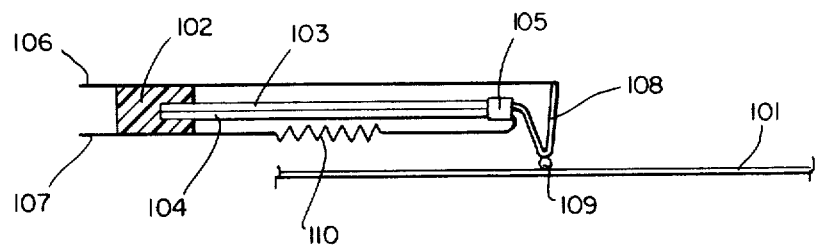
FIG. 1 shows an illustrative embodiment of the principles of the present invention.

In one well known class of thermographic systems, the paper is coated with a microporous coating. Typically, the resins used are thermoplastic, and the application of heat causes loss of the microporous structure and consequent loss of opacity. Thus, if the substrate on which a lightly colored microporous coating is mounted is darkly colored paper, application of heat to the coating causes it to become transparent in the heated areas, thereby disclosing the underlying colored substrate and producing a permanent visual record. However, in such systems, the opacity of the microporous coating may also be eliminated by the application of pressure. Therefore, there is significant need to coordinate the effects brought on by both the heat and the pressure applied to the paper by the thermographic stylus. Such coordination is a primary object and function of the principles of the present invention.

The need for synergism between thermal and pressure effects for such thermographic systems is achieved in accordance with the principles of the present invention by controlled heat radiation onto a bimetallic spring. In accordance with known principles of physics, bimetal elements composed of two or more laminated metallic alloys having different coefficients of thermal expansion may be utilized to detect or to respond to heat change. Depending upon the amount of heat to which the bimetal is subjected, the element having the higher thermal expansion coefficient will bend more severely than the other, thereby producing a physical displacement of the extremities of the bimetallic element. If physical displacement is prevented, similar pressure changes result. Bimetallic elements have been applied chiefly to apparatus requiring ongoing sensitivity to ambient conditions, such as thermostatically controlled systems, and inscription-type recording systems which cut grooves in a record or the like. An example of the latter class in U.S. Pat. No. 2,358,102 to A. C. Robertson.

A comprehensive evaluation of bimetallic elements is rendered in a paper by C. F. Alban entitled "Fundamentals of Bimetal Performance", presented for the A.I.E.E. Appliance Techanical Conference, at Louisville, Kentucky in April, 1953. As is set forth in that article, the element of the bimetal having the lower coefficient of thermal expansion may advantageously be selected from the nickel iron alloys having a range of 36 to 50% nickel. The elements having the higher coefficient of thermal expansion may, for example, be selected from the alloys of nickel, chromium, and iron. Alternately, an alloy of 72% manganese, 18% copper, and 10% nickel has been found to perform well. Typically, the elements of the bimetal are joined together by diffusion welding in the solid state and without the use of intermediate bonding materials.

The foregoing discussion of paper coating and of bimetallic elements has been presented as illustrative of selections of materials which may be made in accordance with the principles of the present invention. By no means, however, are the principles of the present invention to be limited thereto; rather, it is to be understood that any combination of bimetallic elements with temperature/pressure sensitive paper may be utilized.

FIG. 1 shows an illustrative embodiment of the principles of the present invention. In that figure, an insulating block 102 forms the structural basis for the stylus. Embedded in the block 102 is a bimetallic spring element composed of bonded members 103 and 104. At the opposite end of the bimetallic spring is a dielectric insulator block 105. The input voltage to the stylus is coupled to terminals 106 and 107, and is thereby applied to an electrical circuit consisting of a resistive heater 110 and 108. As shown in FIG. 1, the resistive heating element 110 and the writing element 108 are electrically connected in series. It is to be understood, however, that a parallel electrical circuit may be used to similar advantage. Thermally conductive ball 109 provides a preferred method of transmitting heat to the writing surface.

The insulator blocks 102 and 105 serve to isolate the bimetallic spring members 103 and 104 from the electrical circuit including the resisting heating element 110 and the writing element 108 and ball 109. Thus, as the input voltage is placed across terminals 106 and 107, and current flows through the circuit, heat is emitted both by the resistive heating element 110 and by the thermal writing portion 108 and ball 109. As in prior art systems, thermal emission from the ball portion 109 onto the paper 101, combined with the pressure exerted thereby, produces a color change in the paper such as by causing a corresponding part of the microporous coating on the paper 101 to become transparent.

Passage of electrical current through the resistive heating element 110 causes heat to be radiated onto the bimetallic spring members 103 and 104. Therefore, depending upon which of members 103 and 104 has the greater coefficient of thermal expansion, the production of heat by resistive heater 110 will attempt to cause the bimetallic spring to be deflected either away from or toward the paper 101. Said otherwise, the passage of current through the resistive element 110 results in an expenditure of power, and emission of heat, in direct proportion to the voltage across the resistive heating element 110. Therefore, the pressure exerted by the spring element is directly proportional to the input voltage across terminals 106 and 107. Of course, the deflection versus temperature characteristic of the bimetal may be varried by adjustment of the composition of the component elements, but in preferred embodiments deflection and pressure are linear functions of heat. Thus, in a preferred embodiment of the principles of the present invention, the spring element presses down in an amount directly proportional to the voltage across terminals 106 and 107. The proportionality constant may be controlled by varying the resistance of elements 110 and 108.

Figure 2:
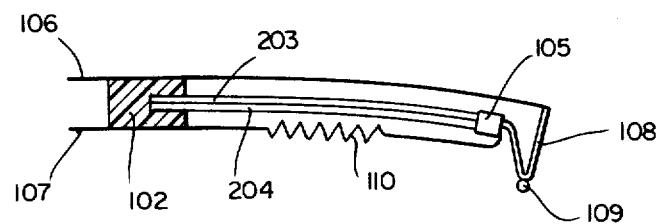
FIG. 2 shows the embodiment of FIG. 1 constructed in accordance with a first alternative approach.
Figure 3:
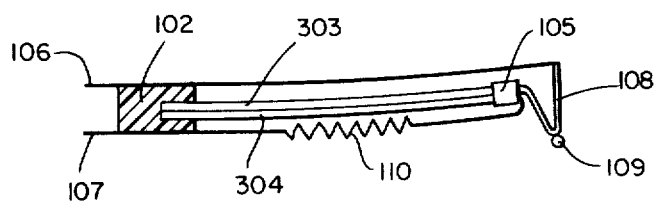
FIG. 3 shows the apparatus of FIG. 1 constructed in accordance with a second alternative approach.

As noted hereinbefore, the degree of voltage responsive pressure change between the stylus and the paper is dependent upon the composition of the bimetal. For instance, if the apparatus is being utilized to transcribe a signal voltage which is rapidly changing and which has high transient content, primary effect for which compensation may be required is possible drag between the "point" element 109 and the paper 101. In such circumstances, it may be desirable to deflect the spring element in a direction which will decrease the pressure for increases of input signal power. Such a case is illustrated in FIG. 3, in which the lower element of the bimetal 304 has the greater coefficient of thermal expansion, while the upper element 303 has the smaller coefficient. In the FIG. 3 embodiment, increased production of heat from the resistive heating element 110 causes a reduction of pressure between the stylus and the paper. Conversely, in situations where pen drag is not a problem, a superior transcription will result if high heat and high pressure both are applied to the paper. FIG. 2 shows an embodiment wherein the upper element 203 has the greater coefficient of thermal expansion, while the lower element 204 has the lesser coefficient. As heat from the resistive heating element 110 is increased, the bimetal of FIG. 2 attempts to deflect toward the writing platen. Since it is restrained from actual deflection, a concomitant increase in pressure is applied. Thus, for the embodiment of FIG. 2, increases in voltage to the stylus, which also increase the speed of the pen across the paper, bring about an increase both in the temperature of the point 109, and in pressure between the stylus and the paper.

It should be understood that while the input to the heater circuit in the pressure controlled thermographic stylus of the present invention will generally be manually controlled, such as by a rheostat, to provide optimum transcription for the particular operating conditions anticipated, it is possible to control this input automatically in response to a feedback or control circuit dependent upon the nature of the signal to be recorded.

It should also be understood that while this invention has been described with reference to a separate resistive heating element and a stylus consisting of a thermally conductive ball on the end of a metallic member, an all-ceramic stylus may also be incorporated in this invention. In this alternative embodiment, heating of the stylus may be accomplished by a film resistor on the surface of the stylus connected either to surface conductors or to one surface conductor and an internal conductor coming through the center of the stylus. In still another alternative, the ceramic stylus may be composed of a semiconductive material such as silicon carbide, so that it may form a circuit element and act itself as a resistive heating element. The heating means thus incorporated either on the surface or in the ceramic stylus itself may also serve as the control heater for the bimetallic pen arm member in the pressure controlled thermographic stylus of this invention.

In all such cases, the central feature of the device is a heated stylus together with a pen arm including a bimetallic element and associated heating means to facilitate control of the pressure with which the stylus presses against the platen and of the temperature of the stylus. This permits optimization of the transcription line made by the stylus and compensation for different operating conditions.

The foregoing has been intended as illustrative of the principles of the present invention. It is to be understood that many alternatives may occur to those skilled in the art without departure either from the spirit or the scope of the present invention, as defined by the appended claims.

What is claimed is:

1. Thermographic apparatus for recording a line traced by a heated scribing element on a writing platen comprising:
   a. a spring element including bonded metallic members having different thermal expansion coefficients and extending between a mounting block and said scribing element; and
   b. heating means, adapted to heat said spring and connected to an electrical circuit, said spring element and said heating means being adapted to vary the pressure of said scribing element against said platen by changes of power input to said circuit.

2. Apparatus as described in claim 1 wherein the one of said metallic members having the larger thermal expansion coefficient is located below the other of said metallic members, whereby increases in said power input cause decreased pressure of said scribing element on said platen.

3. Apparatus as described in claim 1 wherein the one of said metallic members having the lesser thermal expansion coefficient is located below the other of said metallic members, whereby increases in said power input cause increased pressure on said platen.

4. Apparatus as described in claim 1 wherein one of said metallic members consists essentially of an alloy selected from the group of nickel-iron alloys having a nickel composition of from 36% to 50%.

5. Apparatus as described in claim 1 and further including an insulator block to which said spring element and said electrical circuit are attached in electrical isolation from one another.

6. Apparatus as recited in claim 1, wherein said scribing element consists of a thermally conductive ball at the tip of a resistively heated metal member.

7. Apparatus as recited in claim 1, wherein said scribing element consists of a thermally conductive ceramic member with a surface film resistive heater.

8. Apparatus as recited in claim 1, wherein said scribing element comprises a semiconductive ceramic member adapted to be resistively heated upon application of a voltage potential thereto.

9. Apparatus as described in claim 1 wherein one of said metallic members consists essentially of an alloy of manganese, copper, and nickel.

10. Apparatus as described in claim 9 wherein one of said metallic members consists essentially of 72% manganese, 18% copper, and 10% nickel.

11. Apparatus as described in claim 1 wherein said scribing element includes or comprises a second resistive heating means connected with one another.

12. Apparatus as described in claim 11 wherein said two resistive heating means are connected in parallel with one another.

13. Apparatus as described in claim 11 wherein said two resistive heating means are connected in series with one another.

* * * * *